(12) United States Patent  (10) Patent No.: US 8,079,701 B2
Jacquemin  (45) Date of Patent: Dec. 20, 2011

(54) SPECTACLES WITH CONTIGUOUS LENSES

(75) Inventor: Didier Jacquemin, Besancon (FR)

(73) Assignee: Logo SA, Morez (FR)

( * ) Notice: Subject to any disclaimer, the term of this patent is extended or adjusted under 35 U.S.C. 154(b) by 0 days.

(21) Appl. No.: 12/745,043

(22) PCT Filed: Sep. 9, 2008

(86) PCT No.: PCT/EP2008/061904
§ 371 (c)(1),
(2), (4) Date: May 27, 2010

(87) PCT Pub. No.: WO2009/068334
PCT Pub. Date: Jun. 4, 2009

(65) Prior Publication Data
US 2010/0283958 A1 Nov. 11, 2010

(30) Foreign Application Priority Data
Nov. 29, 2007 (FR) ..................... 07 08346

(51) Int. Cl.
*G02C 1/08* (2006.01)
(52) U.S. Cl. .............. 351/95; 351/86; 351/92; 351/106
(58) Field of Classification Search .............. 351/95, 351/92, 90, 91, 93, 94, 86, 83, 103, 106, 351/109
See application file for complete search history.

(56) References Cited

U.S. PATENT DOCUMENTS 4,561,734 A * 12/1985 Ayache .................... 351/103
6,241,353 B1 6/2001 Anger

FOREIGN PATENT DOCUMENTS

| EP | 0999466 A1 | 5/2000 |
| FR | 1051210 A | 1/1954 |
| FR | 2487084 A1 | 1/1982 |

* cited by examiner

*Primary Examiner* — Hung Dang
(74) *Attorney, Agent, or Firm* — Bachman & LaPointe, P.C.

(57) ABSTRACT

So-called 'rimmed' or "half-rimmed" spectacles have two optical or sun lenses with contiguous edges between which is a bridge supporting the nose pads. The lenses are joined together by a central linking element and by a rigid full frame or a partial frame comprising a rigid upper part which is continued by a lower part in the form of two flexible and transparent cords housed in a groove running a the edge of each lens to support them. The spectacles are characterized in that the central linking means is a vertical bar inserted between the extreme adjoining flanks of the contiguous edges of the lenses, respective profiles being formed in the flanks to engage with, by housing, complementary profiles formed on the flanks of the linking bar, in such a way as to locate and secure it, and hence the lenses, without additional mechanical fixing devices.

10 Claims, 4 Drawing Sheets

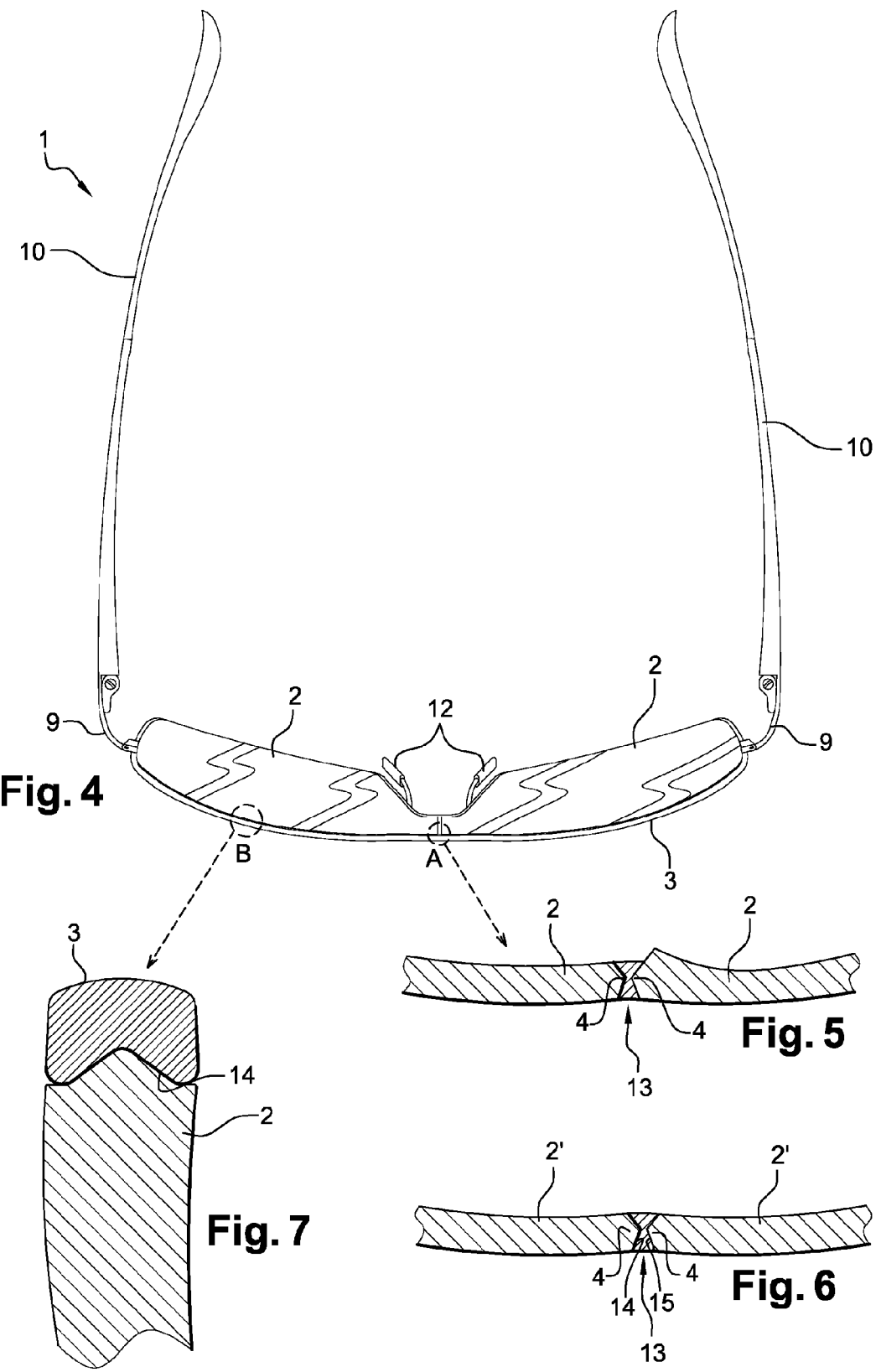

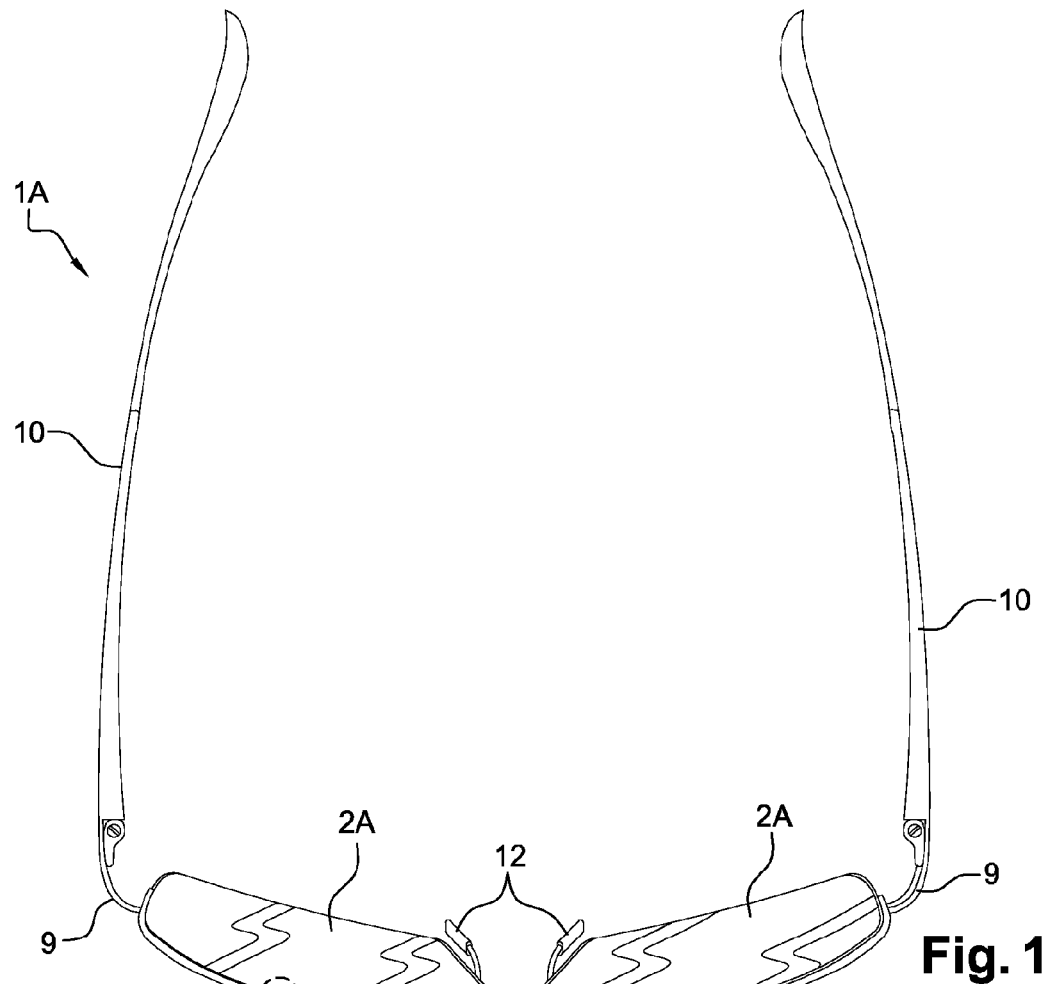
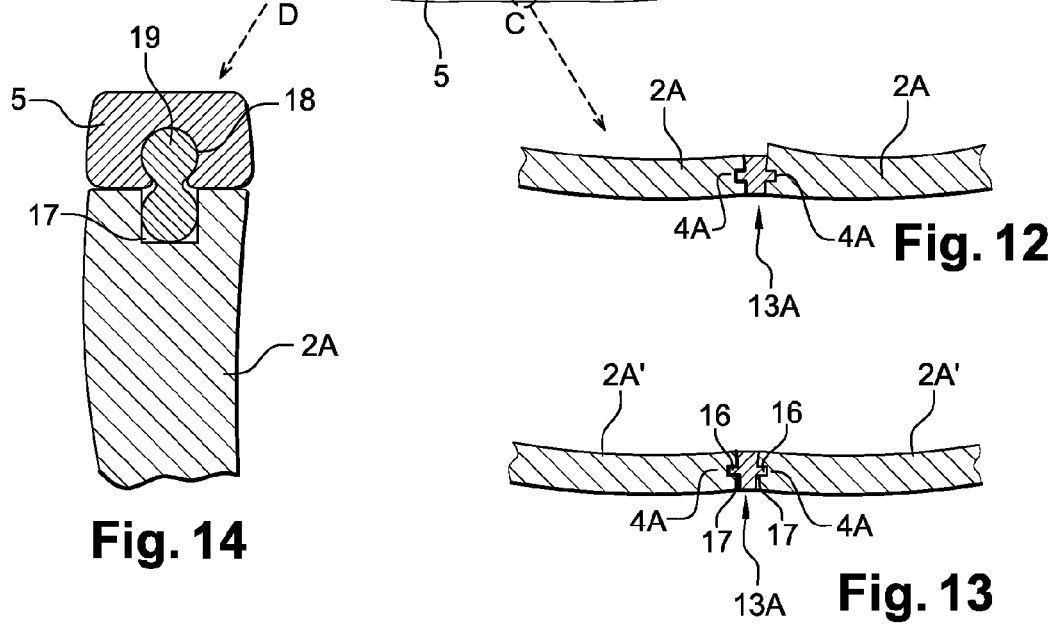

SPECTACLES WITH CONTIGUOUS LENSES

BACKGROUND OF THE INVENTION (1) Field of the Invention

The present invention relates to a pair of spectacles of the type consisting of two optical or sunglass lenses with contiguous edges, joined together by a central connecting member and between which a bridge bearing nose pads is positioned.

(2) Prior Art

French patent 1 051 210 filed on Aug. 9, 1951 describes this type of spectacles comprising an upper frame part into which the back of the lenses is set.

These lenses are fitted and held in position by using the elasticity of the lenses to allow their end edges to be introduced into end housings integral with the frame, and to introduce their central contiguous edges into housings formed in the central connecting element.

That has the advantage of extending the field of view but has the disadvantage of not maximizing it because of the very presence of the central connecting element.

In addition, fitting the lenses by deforming them carries the risk of deforming or even breaking them.

SUMMARY OF THE INVENTION

It is an object of the present invention to minimize the connecting element so as to obtain the maximum field of view which is of course the essential objective of lenses with contiguous edges like those described in French patent 1 051 210.

To that end, the invention relates to a pair of spectacles known as "rimmed" or "half-rimmed" spectacles consisting of two optical or sunglass lenses with contiguous edges between which there is positioned a bridge bearing nose pads and which are joined together by a central connecting element and by a rigid full or part frame comprising a rigid upper part extended by a lower part that consists of two flexible and transparent wires housed in a peripheral groove in each lens in order to support same, characterized in that the central connecting means consists of a vertical strip interposed between the mutually-facing end edge faces of the contiguous edges of the lenses and in which edge faces profiles are respectively created which collaborate by insetting with complementary profiles made on the edge faces of the connecting strip so as to position and retain same, and therefore the lenses, without any ancillary mechanical fastening means.

It will be appreciated that the invention can be used only on rimmed or half-rimmed spectacles according to the definition given thereof hereinabove, precisely because it is the rim, or the half-rim and the wires, which actually hold in position the connecting strip that connects the contiguous edges of the lenses, thus making it possible to dispense with any fixing means that might be required in the case of rimless spectacles.

The invention also relates to the features that will become apparent in the course of the description which will follow, and which should be considered in isolation or in any technically feasible combination thereof.

BRIEF DESCRIPTION OF THE DRAWINGS

This description, which is given by way of non-limiting example, will make it easier to understand how the invention may be formed with reference to the attached drawings in which:

FIG. 4 is a view from above of spectacles according to FIG. 1, but with the arms open.

FIGS. 5 and 6 depict, in longitudinal section and on a larger scale, detail A of FIG. 1 for assembling optical lenses or sunglass lenses, respectively.

FIG. 7 depicts, in cross section and on a larger scale, detail B of FIG. 4 showing the profile of the rim and the complementary profile of the lens.

FIG. 11 is a view from above of spectacles according to FIG. 8, but with the arms open.

FIGS. 12 and 13 depict, in longitudinal section and on a larger scale, detail C of FIG. 11 for assembling optical lenses or sunglass lenses, respectively.

FIG. 14 depicts, in cross section and on a larger scale, detail D of FIG. 11 showing the profile of the half rim and the complementary profile of the lens.

DETAILED DESCRIPTION OF THE PREFERRED EMBODIMENT(S)

Figure 1:
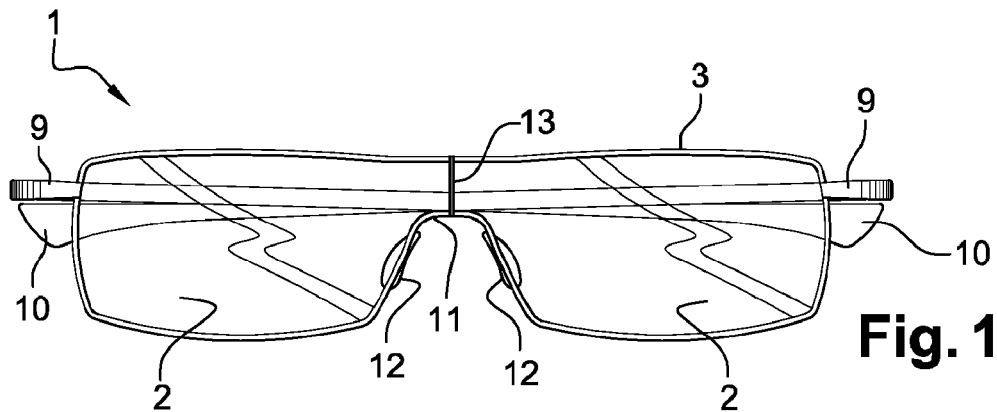
FIG. 1 depicts a front view of spectacles known as "rimmed" spectacles according to the invention, with the arms folded.
Figure 2:
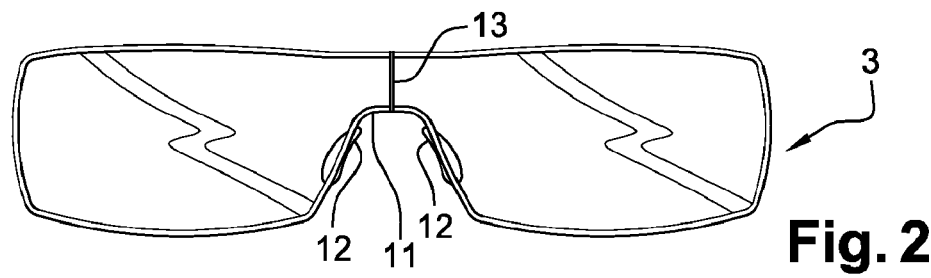
FIG. 2 is a front view of a rim separated from the spectacles according to FIG. 1.
Figure 3:
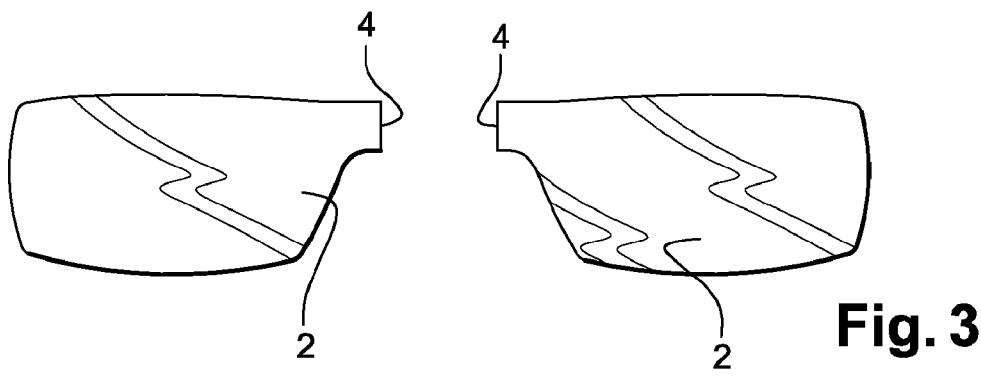
FIG. 3 is a front view of two lenses with contiguous edges which are detached from the spectacles according to FIG. 1.
Figure 8:
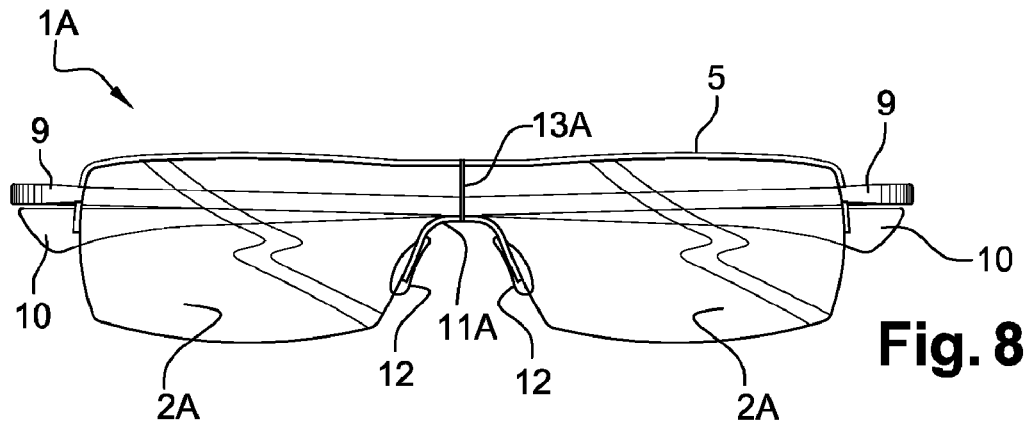
FIG. 8 depicts a front view of spectacles known as "half-rimmed" spectacles according to the invention, with the arms folded.
Figure 9:
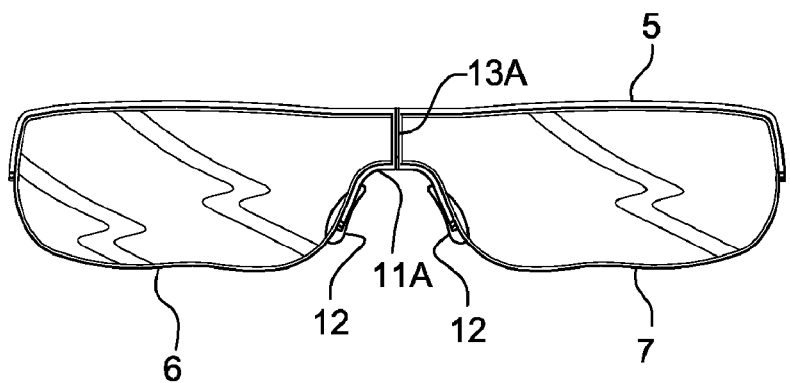
FIG. 9 is a front view of a half rim and its flexible wires detached from the spectacles according to FIG. 8.
Figure 10:
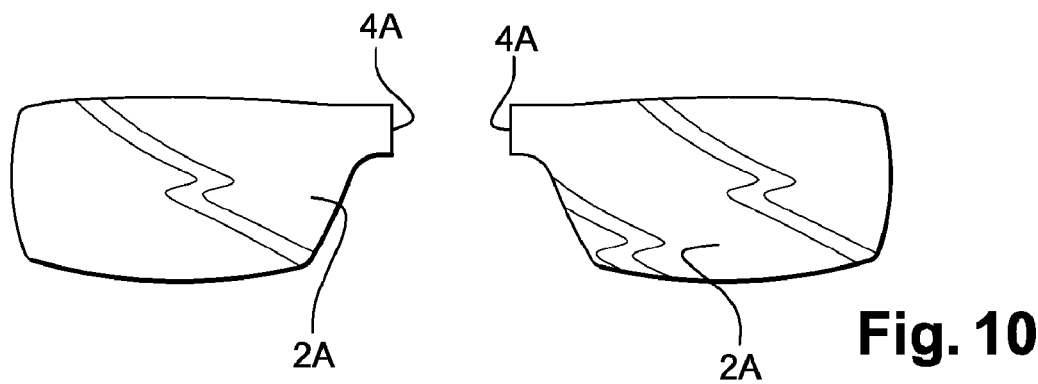
FIG. 10 is a front view of two lenses with contiguous edges which are detached from the spectacles according to FIG. 8.

The spectacles 1 denoted overall in FIGS. 1 to 6 are, according to one of the possible applications of the invention, spectacles of the "rimmed" type, that is to say spectacles in which the optical or sunglass lenses 2 are supported by a rigid frame 3 providing a full rim around the lenses 2; whereas according to the other possible application depicted in FIGS. 8 to 13, the spectacles 1A are of the "half-rimmed" type because the lenses 2A are held by a part frame formed by a rigid upper part or rim bar 5, into which the top of the lenses is set, and which is extended by a lower part consisting of two flexible and transparent wires 6, 7 housed in a peripheral groove 8 in each lens in order to support same, once the wires 6, 7 have been tensioned.

What is common to the two types of spectacles 1, 1A is that full or part frame 3 or 5 is extended at its ends by tenons 9 to which the side arms 10 are hinged. Likewise, the lenses 2, 2A have contiguous edges, between which a bridge 11 bearing nose pads 12 is positioned, said lenses 2, 2A being joined together by a central connecting element 13, 13A.

The difference between the nose pad-bearing bridge of the full-rimmed frame and that of the half-rimmed frame stems from the fact that, in the latter, it is a separate component, whereas in the former, it forms an integral part of the frame.

According to one essential feature of the invention that is common to both types of spectacles 1, 1A, particularly visible in FIGS. 5, 6 and 12, 13, the central connecting means 13, 13A consists of a vertical strip interposed between the mutually-facing end edge faces of the contiguous edges 4, 4A of the lenses 2, 2A and in which edge faces profiles are respectively created which collaborate by insetting with complementary profiles made on the edge faces of the connecting strip 13, 13A so as to position and retain same, and therefore the lenses 2, 2A, without any ancillary mechanical fastening means.

It is important to note that the central connecting strip 13, 13A has a cross section incorporating the insetting profiles that does not encroach on the front or rear faces of the lenses 2, 2A, so that they do not present any impediment to sight, while at the same time allowing the fitting of lenses which are thicker than the thickness of the strip.

This last point relates especially to optical lenses, the thickness of which may vary.

In the case of spectacles 1 known as "rimmed" spectacles, the central connecting strip 13 has, on its edge faces, insetting regions of concave profile 14 able to collaborate with a corresponding convex profile 15 formed on the contiguous edges 4 and on the periphery of each of the lenses 2, so that these are also held and positioned in a groove with the same concave profile 14 formed on the interior periphery of the frame 3 (see FIGS. 5, 6, 7).

The lenses 2 are inset on fitting by first opening up the ends in the region of the tenons 9, which ends are held together by screws.

In the case of spectacles 1A known as "half-rimmed" spectacles, that is to say spectacles in which an upper part frame 5 is extended by flexible wires 6, 7, the central connecting strip 13A has, on its edge faces, two insetting regions of tenon-shaped profile 16 able to collaborate with a corresponding mortise-shaped profile 17 formed on the contiguous edges 4A of the lenses 2A and on the periphery of same, so that these are also held and positioned on the one hand in the lens-mounting groove 18 of the upper part 5 of the frame, via bedding 19 inserted both into the lens-mounting groove 18 and into the mortise-shaped groove 17 formed on the contiguous edges 4A and on the edge faces of the lenses 2A, and on the other hand by the flexible wires 6, 7 that extend the upper frame part 5 and are housed in the same mortise 17 formed on the periphery of the lenses 2A.

Fitting is performed, in the known way, using a flexible, transparent and strong wire fastened to and stretched between the ends of the upper frame part.

In the case of the rimmed spectacles 1, according to FIGS. 1 to 7, the central connecting strip 13 is inseparably connected to the frame 3, on the one hand in an upper region thereof, and on the other hand in a lower region in line with the bridge 11 that bears the nose pads 12, so as to form a one-piece subassembly ready to receive the lenses 2 and obtain a positive connection between the frame and the bridge.

In the case of the half-rimmed spectacles 1A according to FIGS. 8 to 14, the central connecting strip 13 is inseparably connected to the upper part frame 5 on the one hand, and to the bridge 11A that bears the nose pads 12A on the other hand, so as to form a one-piece subassembly ready to receive the lenses 2A, via the flexible wires 6, 7, and obtain a positive connection between the frame and the bridge.

Both scenarios thus avoid separation of the frame parts which could cause the lenses to pop out of the frame.

For preference, the frame 3 or the upper frame part 5, the connecting strip 13, 13A and the bridge 11, 11A that bears the nose pads 12 form an inseparable one-piece subassembly made of metal and welded together.

However, these various elements could equally be made of molded plastic.

The invention claimed is:

1. Spectacles comprising of two lenses with contiguous edges, a bridge between said lenses, said bridge bearing nose pads, said lenses being joined together by a central connecting element and by a rigid full or part frame comprising a rigid upper part extended by a lower part that comprises two flexible and transparent wires housed in a peripheral groove in each lens in order to support same, the central connecting means comprising a vertical central connecting strip interposed between mutually-facing end edge faces of the contiguous edges of the lenses and in which edge faces profiles are respectively created which collaborate by insetting with complementary profiles made on the edge faces of the central connecting strip so as to position and retain same, and therefore the lenses, without any ancillary mechanical fastening means.

2. The spectacles as claimed in claim 1, wherein the central connecting strip has a cross section incorporating the insetting profiles that does not encroach on front faces or rear faces of the lenses, so that the profiles do not present any impediment to sight, while at the same time allowing a fitting of lenses which are thicker than a thickness of the strip.

3. The spectacles as claimed in claim 1, wherein the spectacles are rimmed spectacles and the central connecting strip has, on its edge faces, insetting regions of concave profile able to collaborate with a corresponding convex profile formed on the contiguous edges and on the periphery of each of the lenses, so that the lenses are also held and positioned in a groove with the same concave profile formed on an interior periphery of the frame.

4. The spectacles as claimed in claim 1, wherein the spectacles are half-rimmed spectacles and comprise spectacles in which an upper part frame is extended by flexible wires, the central connecting strip has, on its edge faces, two insetting regions of tenon-shaped profile able to collaborate with a corresponding mortise-shaped profile formed on the contiguous edges of the lenses and on the periphery of same, so that the lenses are also held and positioned on one hand in a lens-mounting groove of an upper part of the frame, via bedding inserted both into the lens-mounting groove and into the mortise-shaped groove formed on the contiguous edges and on the edge faces of the lenses, and on an other hand by the flexible wires that extend the upper frame part and are housed in the same mortise formed on the periphery of the lenses.

5. The spectacles as claimed in claim 1, wherein the spectacles are rimmed spectacles, and wherein the central connecting strip is inseparably connected to the frame, on one hand in an upper region thereof, and on an other hand in a lower region in line with the bridge that bears the nose pads, so as to form a one-piece subassembly ready to receive the lenses and obtain a positive connection between the frame and the bridge.

6. The spectacles as claimed in claim 1, wherein the spectacles are half-rimmed spectacles and wherein the central connecting strip is inseparably connected to the upper part frame on one hand, and to the bridge that bears the nose pads on an other hand, so as to form a one-piece subassembly ready to receive the lenses, via the flexible wires, and obtain a positive connection between the frame and the bridge.

7. The spectacles as claimed in claim 1, wherein the frame or the upper frame part, and the connecting strip and the bridge that bears the nose pads form an inseparable one-piece subassembly made of metal and welded together.

8. The spectacles as claimed in claim 1, wherein the frame or the upper frame part, and the connecting strip and the bridge that bears the nose pads form an inseparable one-piece subassembly made of molded plastic.

9. The spectacles as claimed in claim 1, wherein said vertical central connecting strip extends upwardly from said bridge.

10. The spectacles as claimed in claim 9, wherein said vertical central connecting strip has an end which abuts a surface of said bridge.

\* \* \* \* \*